Oct. 5, 1937.    J. W. SNYDER, JR    2,094,759
LIGHTING SYSTEM
Filed July 20, 1936
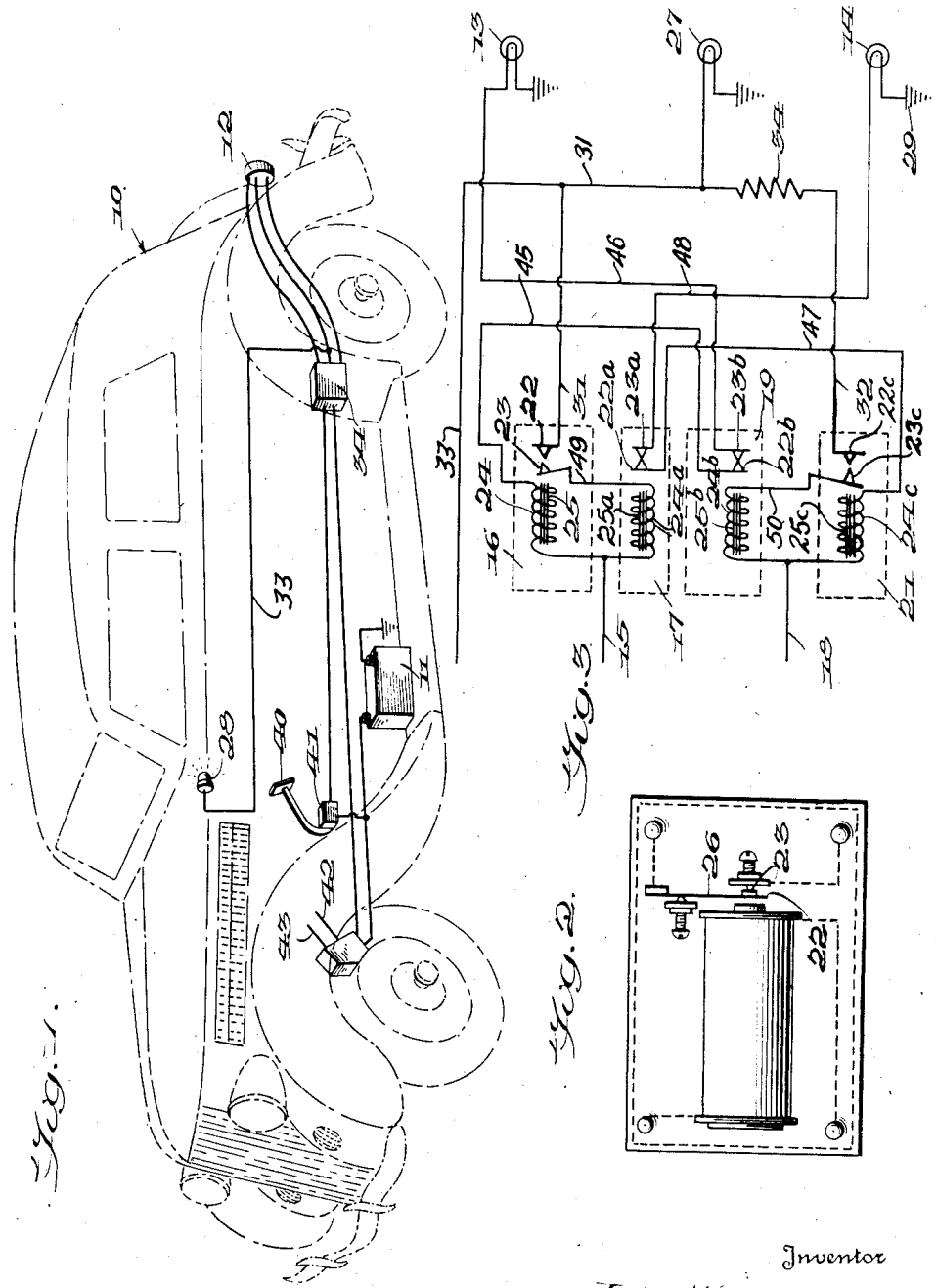
Inventor
John W. Snyder, Jr.
By Kimmel & Crowell
Attorney Patented Oct. 5, 1937

2,094,759

UNITED STATES PATENT OFFICE 2,094,759

LIGHTING SYSTEM

John W. Snyder, Jr., Portsmouth, Va.

Application July 20, 1936, Serial No. 91,595

4 Claims. (Cl. 177—311)

This invention relates to a lighting system and more particularly but not necessarily to automobile lights.

It is one object of this invention to provide an improved lighting system for automobiles.

Another object is to provide a lighting system for automobiles wherein the hazard of such signals as stop light, tail light, and headlights being inoperable will at all times be avoided.

Another object is to provide an auxiliary lighting system for use in connection with the conventional lighting circuit of an automobile and which also will indicate to the operator the condition of the lighting systems.

A further object is to provide in a lighting system novel means for replacing the signal lights on an automobile when such lights become inoperable by the burning out of the bulbs or the like.

The above and other objects will be made apparent throughout the further description of the invention when taken in connection with the accompanying drawing wherein like reference characters refer to like parts. It is to be distinctly understood that the drawing is not a definition of the invention, but illustrates one form showing how the invention may be carried out. The scope of the invention will be defined by the appended claims.

In the drawing:

Figure 1 is a perspective view of an automobile illustrating one form of light connections embodying the invention, Figure 2 is a plan view of an electromagnetic switch embodying the invention, and Figure 3 is a wiring diagram embodying the invention.

Referring to the drawing, 10 indicates an automobile or a similar vehicle having illustrated thereon more or less diagrammatically a part of the wiring of the lighting system. In the form shown there is what is known as the stop light and rear light. The stop light being indicated by 13 and the rear light by 14 and an emergency light 27, the purpose of which will be later described. In the preferred form of the invention, the three lights 13, 14 and 27 are arranged in a single casting as indicated at 12.

The wiring diagram illustrated by Figure 3 is here employed to illustrate the novel arrangement of circuits embodying the invention. This same system may be employed for the headlights which are usually arranged for city and country driving and it is elected to explain the invention in connection with the conventional stop light and rear light.

In the form shown the usual battery 11 for supplying current to the lighting system is positioned on the car at any convenient place and from this source of current extend conductors 15 and 18. The conductor 15 is primarily adapted to furnish current to the stop light 13 which is grounded as shown, while the circuit 18 is employed for supplying current to the rear light 14 which is also grounded as shown.

The conductors 15 and 18 will preferably be known as main conductors and to each of these conductors there is connected in multiple a pair of relays, the relays indicated generally at 16 and 17 being connected to the conductor 15 while the relays 19 and 21 are connected to the conductor 18. For the purpose of this specification, the relays 17 and 19 will be known as the first relays of the respective pairs while the relays 16 and 21 will be similarly known as the second relays of the respective pairs. Now, starting with the relay 16 it will be noted that this relay has a winding 24 and a core 25. The relay also is provided with a contact 23 and a contact 22. As seen in Figure 2, it will be noted that the contact 22 forms an armature and is carried by a spring arm 26 which urges it into engagement with the contact 23. However, when the winding 24 of the relay 16 is energized then the contact 23 will be moved away from the contact 22 and the contacts will be open. Similarly the relay 17 is provided with a winding 24a, a core 25a, a contact 22a and a contact 23a. In this connection there is a contact 23a which forms a movable contact and the contact 22a forms the fixed contact so that when the winding 24a is energized, the contact 23a is closed on the contact 22a. Again, in the relay 19 there is provided a winding 24b which is wound on a core 25b and there is a fixed contact 22b and a movable contact 23b which is held closed on the fixed contact 22b upon energization of the relay 19. Finally the relay 21 is provided with a winding 24c on a core 25c and with a fixed contact 22c and a movable contact 23c, the arrangement being the same as in the relay 16. From the winding 24 extends a conductor 45 which leads to the contact 22b. From the contact 23b extends a conductor 46 which leads to the stop light 13. From the winding 24c extends a conductor 47 which leads to the contact 22a and from the contact 23a extends a conductor 48 which leads to the rear light or tail light 14. Now, it will be observed that each of the lights 13 and 14 is conductively connected to the winding of one of the second relays of one pair of relays through the contacts of the first relay of the other pair of relays. The emergency lamp 27 has leading therefrom a multiple connection one branch of which is formed by a conductor 31 and connects the light 27 with the contact 22. The contact 23 is connected by a conductor 49 with the winding 24a. The other branch of this multiple connection to the lamp 27 includes a conductor 32 and resistance 34 which connect the contact 22c to the lamp 27, the resistance being in series in the connection. The contact 23c is connected to the winding 24b. It is now to be observed that each of these multiple connections to the emergency lamp 27 provides for a connection between the first relay of a pair of the relays and the emergency lamp through the normally open contacts of the second relay of the same pair of relays. Furthermore, a lamp 28 will be mounted on the dash of the automobile and connected to the conductor 31 by a conductor 33 for the purpose of enabling the operator of the automobile to determine the condition of the lights at the rear of the vehicle.

Now, under normal conditions the several relays will be energized. Accordingly, the contacts 22a and 23a will be closed as will the contacts 22b and 23b. Consequently current will flow from the battery through the conductor 15, winding 24, conductor 45, contact 22b, contact 23b and conductor 46, to the lamp 13. Similarly current will flow from the battery through the conductor 18, winding 24c, conductor 47, contact 22a, contact 23a and conductor 48 to the rear light 14. At the same time the energization of the relays 16 and 21 will open the contact 23 from the contact 22 and will open the contact 23c from the contact 22c. However, should the light 13 burn out or its circuit be interrupted by the break or disengagement of the conductor 46, current will no longer flow through the winding 24. In consequence, the relay 16 will be de-energized and the contact 23 will close on the contact 22. When this occurs current will flow from the battery through the conductor 15, winding 24a, conductor 49, contact 23, contact 22, and conductor 31 to the emergency lamp 27.

Now, the energization of the relay 17 will open the contact between the contacts 22a and 23a so that the rear light will also be extinguished. This is desirable because it avoids confusing the emergency lamp with either the stop light or the tail light of the automobile. Similarly if anything occurs to break or disengage the contact 48 or if the light 14 burns out then the relay 21 will be de-energized, the contact 23c will close on the contact 22c and current will flow from the battery through the conductor 18, winding 24b, conductor 50, contact 23c, contact 22c, and conductor 32 and resistance 34 to the emergency lamp 27. Since the relay 19 will be energized the contact 22b will open from the contact 23b and stop light 13 will be extinguished as before. Obviously, whenever current flows through either of the conductors 31 or 32, part of the said current will flow through the conductor 33 and thus light the lamp 28.

What I claim is:—

1. In a signal lighting system, a source of current, a pair of main conductors leading from said source, a pair of relays connected in multiple to each of said main conductors, each relay including a winding and a pair of contacts, the contacts of the first relay of each pair being normally closed and the contacts of the second relay of each pair being normally open during energization of the second said relays, a pair of signal lamps, conductive connections for each of said lamps connecting the winding of the second relay of a respective pair of relays to the lamp through the contacts of the first relay of the other pair, an emergency lamp, and normally open multiple conductive connections for the emergency lamp, each of said multiple connections connecting the emergency lamp to the winding of the first relay of one pair of relays through the contacts of the second relay of the same pair of relays.

2. In a signal lighting system, a source of current, a pair of main conductors leading from said source, a pair of relays connected in multiple to each of said main conductors, each relay including a winding and a pair of contacts, the contacts of the first relay of each pair being normally closed and the contacts of the second relay of each pair being normally open during energization of the second said relays, a pair of signal lamps, conductive connections for each of said lamps connecting the winding of the second relay of a respective pair of relays to the lamp through the contacts of the first relay of the other pair, an emergency lamp, and normally open multiple connections connecting the emergency lamp to the winding of the first relay of one pair of relays through the contacts of the second relay of the same pair of relays, one of said multiple connections including a balancing resistance.

3. In a signal lighting system, a source of current, a pair of main conductors leading from said source, a pair of relays connected in multiple to each of said main conductors, each relay including a winding and a pair of contacts, the contacts of the first relay of each pair being normally closed and the contacts of the second relay of each pair being normally open during energization of the second said relays, a pair of signal lamps, conductive connections for each of said lamps connecting the winding of the second relay of a respective pair of relays to the lamp through the contacts of the first relay of the other pair, an emergency lamp, normally open multiple conductive connections for the emergency lamp, each of said multiple connections connecting the emergency lamp to the winding of the first relay of one pair of relays through the contacts of the second relay of the same pair of relays, a warning lamp remote from said signal and emergency lamps, and a branch conductive connection between one of said multiple connections to the emergency lamp and said warning lamp.

4. In a signal lighting system, a source of current, a pair of main conductors leading from said source, a pair of relays connected in multiple to each of said main conductors, each relay including a winding and a pair of contacts, the contacts of the first relay of each pair being normally closed and the contacts of the second relay of each pair being normally open during energization of the second said relays, a pair of signal lamps, conductive connections for each of said lamps connecting the winding of the second relay of a respective pair of relays to the lamp through the contacts of the first relay of the other pair, an emergency lamp, normally open multiple conductive connections for the emergency lamp, each of said multiple connections connecting the emergency lamp to the winding of the first relay of one pair of relays through the contacts of the second relay of the same pair of relays, a warning lamp remote from said signal and emergency lamps, and a branch conductive connection between one of said multiple connections to the emergency lamp and said warning lamp, the remaining multiple connection having a balancing resistance interposed therein.

JOHN WM. SNYDER, Jr.